Patented June 24, 1924.

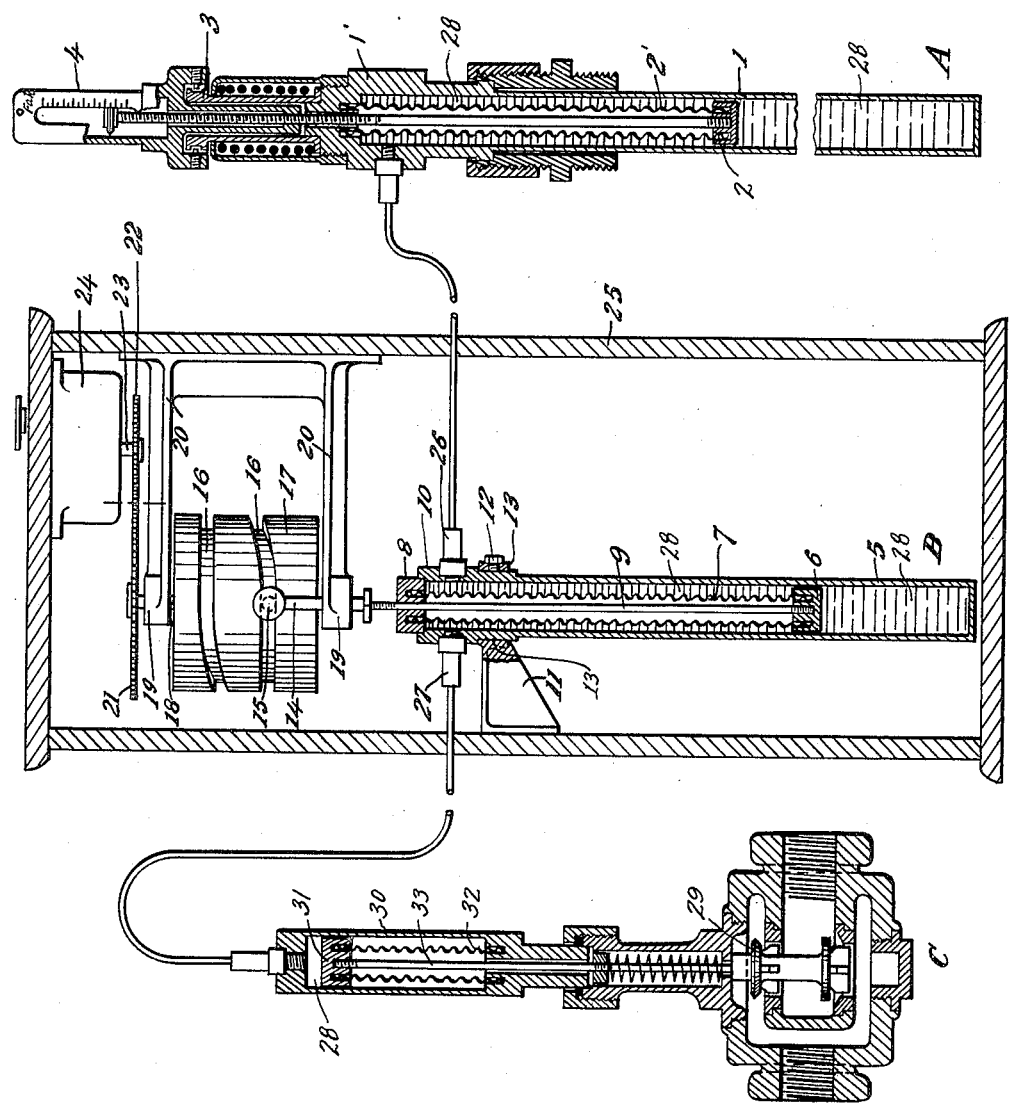

UNITED STATES PATENT OFFICE.

BERNARD R. WINGFIELD, OF WEST DRAYTON, ENGLAND.

AUTOMATIC TEMPERATURE REGULATOR.

Application filed July 21, 1922. Serial No. 576,582.

*To all whom it may concern:*

Be it known that I, BERNARD ROBERT WINGFIELD, a subject of the King of Great Britain, residing in West Drayton, England, have invented certain new and useful Improvements in Automatic Temperature Regulators, of which the following is a specification.

The present invention relates to improvements in automatic temperature regulators and consists in the arrangements, combinations and constructions herein described and claimed.

In the drawing,

The figure is a cross sectional view through an improved regulator constructed according to the present invention and through a thermostat and valve coupled thereto.

Referring more particularly to the drawing, the thermostat is shown generally at A; the improved regulator at B and the valve and its operating mechanism at C.

The thermostat may be of any approved type and in the instance shown is of a well known form involving the tube 1 containing the liquid 28 and a regulating piston 2. The piston 2 is connected by the extensible metallic tubing 2' to the cap 1'.

The device C comprises a tube 30 in which is a reciprocating piston 31 connected to the lower end of the tube by the extensible tubing 32. The piston is connected to the piston rod 33 which is coupled to the valve 29.

The invention is shown at B and consists of a tube 5, which is also filled with a liquid 28, a regulating piston 6, which is joined to the cap 8 by the extensible flexible metallic tubing 7, a piston rod 9 and a head 10, to which the tube 5 and cap 8 are connected. The tube 5 and associated parts are shown as supported by a bracket 11 having an opening 13 to receive the head portion 10. A set screw 12 is threaded through the bracket and into the head 10 to bind the parts in the bracket. An adjustable extension portion of the piston rod 9 carries a pin or roller 15 engaging in a cam groove 16 formed on a rotary member, such as the cylinder or drum 17. The shaft 18 of the drum is supported in bearings 19 upon the bracket arms 20. On the shaft 18 is a gear wheel 21 meshing with a companion gear wheel 22 which is fixed to the drive shaft 23. A motor is shown at 24, and this motor may take the form of a clockwork mechanism.

A box 25 preferably houses the parts of the controller B and capillary tubes from the liquid spaces of the thermostat and valve tube are shown as connecting with the tube 5 of the controller at 26 and 27.

The operation of the device is as follows:

The temperature to which the thermostat is exposed causes the liquid in the tube 1 to expand and to act through the capillary tubing upon the plunger or piston of the valve C forcing the valve toward its seat. If the temperature exceeds a predetermined maximum, the valve 29 will be entirely closed. If it is desired, however, to raise this predetermined maximum temperature at which the valve 29 is to be closed, this is accomplished by raising the plunger 6 of the control mechanism B.

The fluid space in the tube 5 is thereby enlarged so that the expanding liquid in the thermostat A will be obliged to fill up this enlarged space in the controlling mechanism before such fluid will act upon the piston 31 of the valve mechanism C. On the other hand should the control piston 6 be lowered the fluid space is diminished and constantly the fluid will act to close the valve at a lower temperature. The piston 6 is raised and lowered by action of the cam groove 16 and the rotary drum 17. This groove is formed spirally of the drum so that upon rotation of the drum in one or the other direction, the piston 9 will be compelled to partake of a rectilinear movement.

The clockwork mechanism 24 acts positively through the gears upon the drum, so as to shift the plunger 6 gradually up or gradually down so that the predetermined maximum temperature at which the valve 29 will close may be varied at different times.

Having thus described the nature of the said invention, and the best means I know of carrying the same in practical effect, I claim:—

1. In a self-contained automatic temperature regulator of the kind herein described, the combination of a liquid containing thermostat, a valve, operating means for the valve, a liquid containing controlling device arranged in communication with the thermostat and with said valve operating means, mechanically operated means connected to the controlling device for varying the liquid capacity of said device by a definite amount in a definite time and for varying the temperature at which the thermostat operates, said controlling device and means comprising a liquid containing cylinder, tubular connections between the interior of the cylinder and said thermostat and said element, a cap on said cylinder, a piston for the cylinder, a flexible tube connecting the piston and the cap, a piston rod fixed to the piston, said rod extending through the cap and controlling means connected to the outer extended end of said rod for moving said rod and piston at the desired rate of speed and to the desired extent.

2. In a self-contained automatic temperature regulator of the kind herein described, the combination of a liquid-containing thermostat, a valve, operating means for the valve, a liquid-containing controlling device arranged in cooperative relation with the thermostat and with valve operating means, and mechanically operated means correlated with the controlling device for varying the liquid capacity of said device by a definite amount in a definite time, and for varying in a predetermined manner the temperature at which the thermostat operates, said controlling device and means comprising a liquid-containing cylinder, tubular connections between the interior of the cylinder, the said thermostat and said element, an apertured cap on said cylinder, a piston in the cylinder, a flexible tube connecting the piston and the cap, a piston rod fixed to the piston, said rod having an adjustable extension protruding through the apertured cap, a rotatably mounted member provided with a cam path, means for rotating the cam member, a roller carried by the piston rod extension and arranged to engage with said cam path, whereby the position of the piston in the cylinder varies in accordance with the cam path, as and for the purposes described.

In testimony whereof I have signed my name to this specification.

BERNARD R. WINGFIELD.